No. 665,594. Patented Jan. 8, 1901.
A. BRADY.
CHANGEABLE GEARING.
(Application filed July 23, 1900.)
(No Model.)

Witnesses
Howard D. Orr.
Geo. F. Chandlee.

Alford Brady, Inventor,
by C. A. Snow & Co.
Attorneys

UNITED STATES PATENT OFFICE.

ALFORD BRADY, OF GALVESTON, TEXAS, ASSIGNOR OF ONE-HALF TO GUS. REYMERSHOFFER, M. ROSENBERGER, AND M. M. LEVY, OF SAME PLACE.

CHANGEABLE GEARING.

SPECIFICATION forming part of Letters Patent No. 665,594, dated January 8, 1901.

Application filed July 23, 1900. Serial No. 24,546. (No model.)

*To all whom it may concern:*

Be it known that I, ALFORD BRADY, a citizen of the United States, residing at Galveston, in the county of Galveston and State of Texas, have invented a new and useful Changeable Gearing, of which the following is a specification.

This invention relates to changeable gearing adapted for use upon bicycles and similar vehicles, although it will be understood from the following description that the principles involved may be utilized in other specific capacities, one object of the invention being to provide a construction in which a multiplication of speed may be secured or not, as may be desired, a further object of the invention being to provide a simple and efficient means for thus shifting the operative connection of the mechanism.

Figure 1:
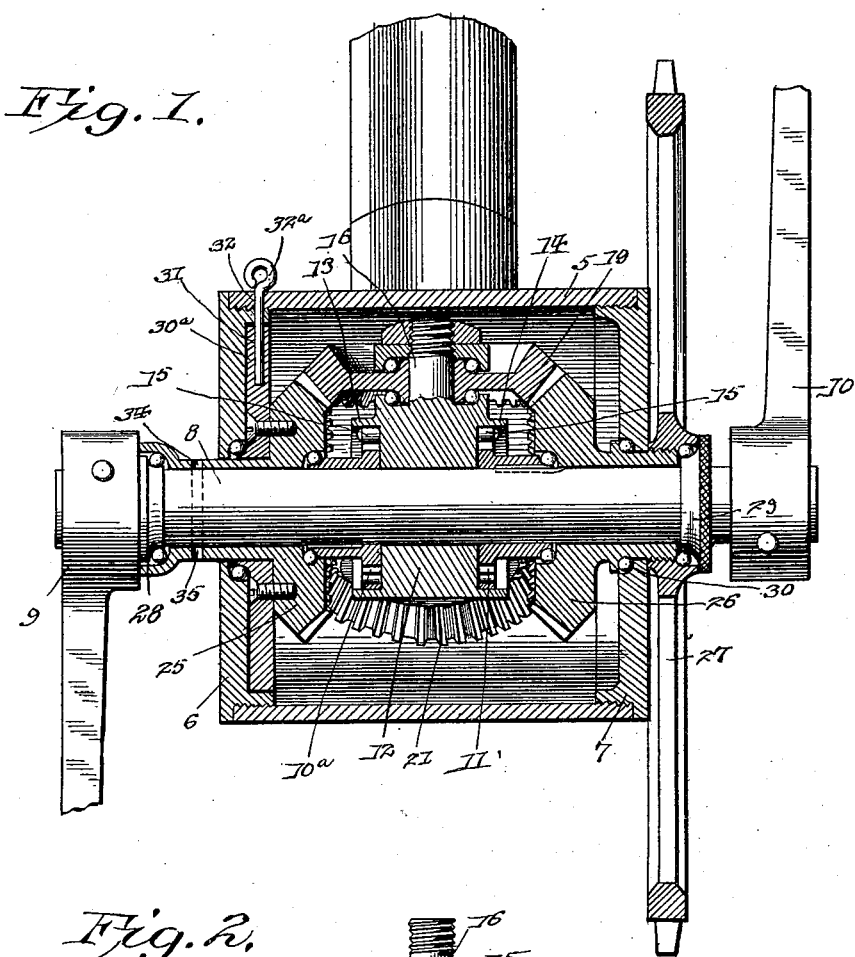
Figure 2:
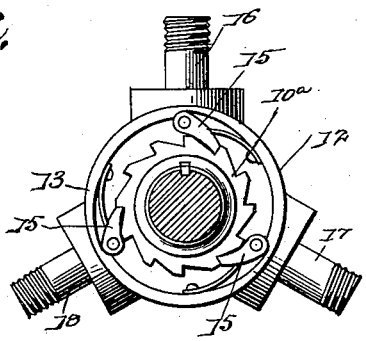

In the drawings forming a portion of this specification, and in which like numerals of reference indicate similar parts in both views, Figure 1 is a central section taken through the crank-hanger of a bicycle and showing, partly in section and partly in elevation, the parts of the gearing with the crank-axle. Fig. 2 is a section taken through the crank-axle at one side of the hub of the stub-shafts thereon and showing the ratchet connection between the hub and shaft, the bevel-gears being removed from the shafts.

Referring now to the drawings, 5 represents the crank-hanger, having the usual disks 6 and 7 engaged with its ends for closing the ends of the hanger and for adjusting certain bearings. Through the disks 6 and 7 is passed a crank-axle 8, having cranks 9 and 10 fixed to its ends, and upon the axle and spaced at opposite sides of the middle point thereof are ratchet-wheels 10 and 11, which are keyed or otherwise fixed to the axle.

Between the ratchets 10 and 11, mounted upon the axle 8, is a hub 12, having its ends countersunk, as shown, to form two annular flanges 13 and 14, which encircle the ratchet-wheels, and pivoted to the ends of the hub within the inclosure of these flanges are pawls 15, disposed to coöperate with the ratchets 10 and 11 in such manner that when the crank-axle is rotated forwardly the pawls will engage the ratchets to rotate the hub forwardly, but when the axle is rotated rearwardly or the hub is rotated forwardly there will be independent motion between these parts. The ratchets are disposed in contact with the ends of the hub 12 within the countersinks thereof, and while they permit rotation of the hub they prevent longitudinal movement thereof upon the axle.

Extending radially from the hub 12 and spaced equidistant are three stub-shafts 16, 17, and 18, each of which has a bevel-gear 19, rotatably mounted thereon and having ball-bearings, as shown.

Mounted loosely upon the crank-axle and at opposite sides of the ratchet-wheels are two bevel-gears 25 and 26, both of which mesh with the bevel-gears upon the stub-shafts, and the hubs of both of which gears 25 and 26 extend exteriorly of the crank-hanger through the disks 6 and 7, the hub of the wheel 26 having the crank-sprocket 27 engaged therewith, as shown, for rotation thereby. Bearing-balls disposed between the hub of the sprocket 27 and a race upon the shaft and between the hub of the gear 26 and the hub of the ratchet 11 support the gear 26 and the parts carried thereby. The bevel-gear 25 is supported upon balls disposed between the outer end of its hub and a race 28 on the crank-axle and by other balls disposed between the inner end of the hub and the hub of the ratchet-wheel 10, the adjustment of these several ball-bearings being accomplished by manipulation of the adjustable race 29, with which the balls 30 at the outer end of the hub of gear 26 are engaged.

Within the crank-hanger and fixed to the outer face of the gear-wheel 25 is a disk $30^a$, which lies in a recess of the inner face of the disk 6 and has a perforation 31 formed radially thereof and adapted to register with a corresponding perforation 32, formed in the crank-hanger shell and the flange of the disk 6, so that when it is desired to hold the disk $30^a$ from rotation a pin $32^a$ may be engaged with these perforations, as shown.

With the pin $32^a$ in the position shown in Fig. 1 of the drawings if the crank-axle be rotated the gear 25 will be held stationary and the sprocket-wheel will be rotated twice for each rotation of the axle, thus multiplying the speed of the sprocket. When it is desired to have the sprocket rotate with the shaft or axle, the pin 32ª is withdrawn from the perforations of the crank-hanger and disks and is inserted in alined perforations 34 and 35 in the axle and the hub of gear 25, respectively. With this construction it will be seen that the sprocket is locked to rotate with the crank-axle in one direction, while it may rotate freely of the axle in the opposite direction, and, furthermore, that the sprocket may be locked to rotate with the axle or may be caused to rotate at a higher speed than the axle.

It will be understood that in practice various modifications of the specific construction shown may be made and that any suitable materials and proportions may be used for the various parts without departing from the spirit of the invention.

What is claimed is—

1. A changeable gear comprising an axle, a hub mounted loosely upon the axle, a ratchet fixed upon the shaft at each side of the hub and in contact therewith to prevent movement of the hub longitudinally of the shaft, pawls carried by the hub for engagement with the ratchets for rotating the hub when the axle is rotated in one direction and to permit free rotation of the hub in the opposite direction, stub-shafts upon the hub, gears carried by the stub-shafts and movable bodily therewith about the axle, gears mounted loosely upon the axle and engaging the gears upon the hub, a driven member carried by one of the gears upon the axle and means for locking the second gear alternately to rotate with the axle and against rotation with the axle.

2. A changeable gear comprising an axle, a casing inclosing a portion of the axle, stub-shafts carried by the axle, bevel-gears upon the stub-shafts, bevel-gears loose upon the axle and engaged with the gears upon the stub-shafts, a driven member carried by one of the gears upon the shaft, the second gear of the shaft having its hub extended exteriorly of the casing, said extending portion having a perforation therein, and the shaft having a perforation for alinement with the perforation of the gear-hub, a pin for engagement with said perforations to lock the gear to the shaft, and a disk upon said gear and having a perforation for alinement with a perforation in the casing, the perforations of the disk and casing being adapted to receive the pin interchangeably with its engagement with the shaft and gear thereon.

In testimony that I claim the foregoing as my own I have hereto affixed my signature in the presence of two witnesses.

ALFORD BRADY.

Witnesses:
I. LOVENBERG, Jr.,
F. L. LEE.